United States Patent
Kovac

[11] Patent Number: 5,871,320
[45] Date of Patent: Feb. 16, 1999

[54] INSULATION RETAINER

[75] Inventor: Zdravko Kovac, Chesterfield, Mich.

[73] Assignee: Emhart Inc., Newark, Del.

[21] Appl. No.: 998,904

[22] Filed: Dec. 29, 1997

[51] Int. Cl.⁶ .............................. F16B 37/04; F16B 21/00
[52] U.S. Cl. ........................ 411/182; 411/344; 411/433; 411/508
[58] Field of Search ........................... 411/340, 344–346, 411/180, 172–176, 433, 437, 508

[56] References Cited

U.S. PATENT DOCUMENTS

| | | |
|---|---|---|
| 4,850,778 | 7/1989 | Clough .................................... 411/182 |
| 4,883,382 | 11/1989 | Mushya . |
| 5,195,857 | 3/1993 | Hiramoto . |
| 5,291,639 | 3/1994 | Baum et al. . |
| 5,332,347 | 7/1994 | Kimisawa ................................ 411/182 |
| 5,342,147 | 8/1994 | Leon . |
| 5,366,332 | 11/1994 | Murphy . |
| 5,511,283 | 4/1996 | Hirose ..................................... 411/508 |
| 5,775,859 | 7/1998 | Ancher .................................... 411/344 |

Primary Examiner—Flemming Saether
Attorney, Agent, or Firm—Edward D. Murphy

[57] ABSTRACT

A retaining device for securing insulation to sheet metal has a flange, an articulated structure and a push plate having an aperture therethrough such that when the retainer, except for the flange, is inserted in a hole in the insulation layer it allows a push plate to be pushed towards the flange, causing a pair of locking fingers to pivot and press up against the underside of the insulation in a locked position. The retaining device is then frictionally fitted over a stud member on the sheet metal to which the insulation layer is to be secured.

5 Claims, 2 Drawing Sheets

INSULATION RETAINER

BACKGROUND OF THE INVENTION

This invention relates to an insulation retaining device for securing a layer of insulation material to sheet metal and more particularly to a fastening device for affixing an insulation layer to sheet material normally used in the construction of motor vehicle interiors.

OBJECT AND SUMMARY OF THE INVENTION

It is a primary purpose and principle object of the present invention to provide an insulation retainer device that will secure insulation material to sheet material and that can be removed and reused if so desired.

One feature of the present invention is the provision of a snap-in locking fastener device that will secure a portion of insulation sheet material for the ready attachment to an upstanding stud on a layer of sheet material.

Another feature of the present invention is to provide an serviceable insulation retainer device that will releasably lock onto a sheet of insulation material for the purpose of being subsequently affixed to a stud on a layer of sheet metal.

According to one embodiment of the invention there is provided a retaining device having a flange which has a greater diameter than a hole in a layer of insulation material. The remaining structure of the retaining device has a diameter which is slightly smaller than the hole and is thus inserted through the hole and then pushed back towards the flange, causing a pair of locking fingers associated with an articulated structure to pivot and press up against the underside of the insulation in a locked position. The retaining device is then fitted onto a stud member on the sheet metal against which the insulation layer is to be secured.

The invention will be better understood as well as further objects and advantages thereof become more apparent from the ensuing detailed description taken in conjunction with the drawings.

DETAILED DESCRIPTION

Figure 1:
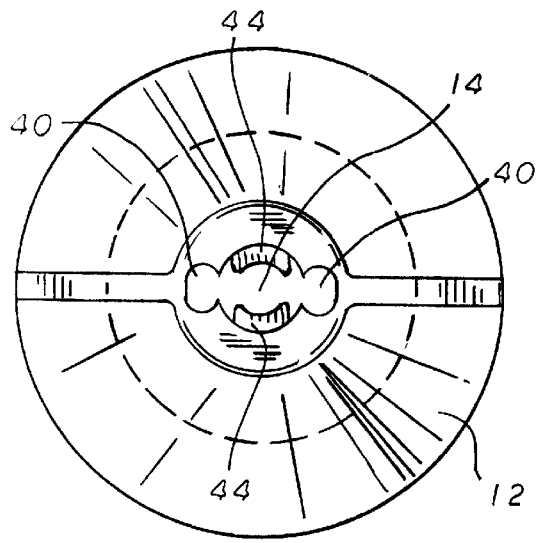
FIG. 1 is top plan view of the insulation retaining device according to the invention.
Figure 2:
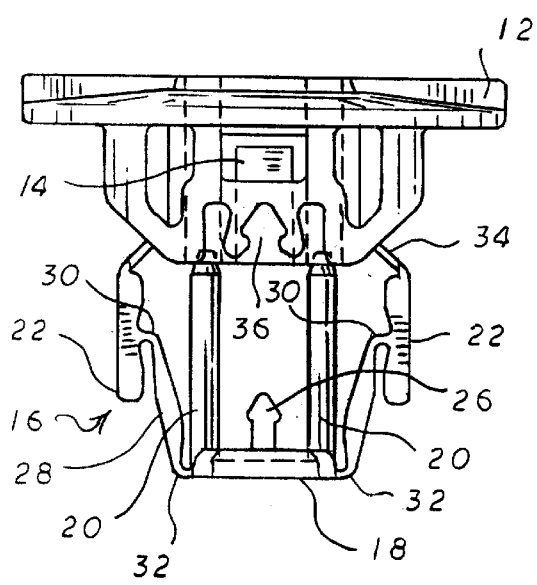
FIG. 2 is a schematic side elevational view of the retaining device shown in the expandable position when it is inserted through a hole in the insulation material.
Figure 3:
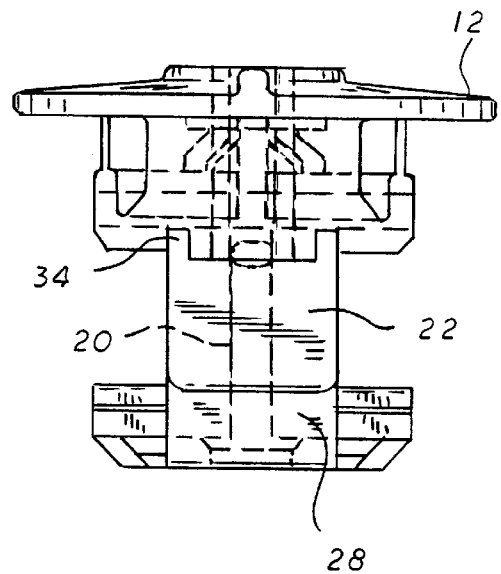
FIG. 3 is a schematic side-elevational view of the device shown in FIG. 1 but turned 90 degrees.

Referring to FIGS. 2 and 3, there is shown the insulation retainer 10 in its extended inoperative position. The retainer is seen to have a top flange member 12 (see also FIG. 1), a central aperture 14, a stem portion having an articulated structure 16 and a base that includes a push plate 18, all of which surround the aperture 14. Further provided are a pair of guide pins 20, and a pair of locking fingers 22, which will be more fully described below. Except for the flange 12, the retainer 10 in its expanded position can be inserted through a hole in the insulation 24, which may be one of several holes in a layer or sheet of insulation material suitable for use in the fabrication of vehicle interiors.

As further shown in FIG. 2, the push plate 18 carries on its upper side on the peripheral portion thereof a locking member 26 having an enlarged head portion which extends along the length of the push plate 18 except where the central aperture 14 is located, as shown in FIG. 3. The locking fingers 22 are seen to to be connected between a pair of side edges of the push plate 18 and the stem of the retainer 10 by the articulated structure 16. The entire structure that makes up the retaining device, including the articulated structure 16 in its extended state is molded in place by conventional molding techniques as a one-piece article of manufacture.

The articulated structure 16 is seen to have a leg member 28 which has a thin flexible strip portion 30 connecting one end thereof to a central portion of the locking finger 22 and another flexible portion 32 connecting the other end thereof to the push plate 18, as shown. The fingers 22 in turn are shown to each have a flexible portion 34 connecting one end thereof to the stem portion of the retainer.

Disposed in the base of the stem portion of the retainer 10 is a locking receptacle 36 that complements in extent the locking member 26 on the push plate 18 and extends the diagonal length of the base of the retainer 10, except for the central aperture 14, as shown. Additionally, the flange portion 12 has a pair of recesses or guide holes 40 that flank the central aperture 14 and are aligned with the guide pins 20 extending up from the push plate 18. Disposed on the interior surface of the central aperture 14 is a pair of oppositely facing pliable locking teeth 44, to be more fully explained below.

Figure 4:
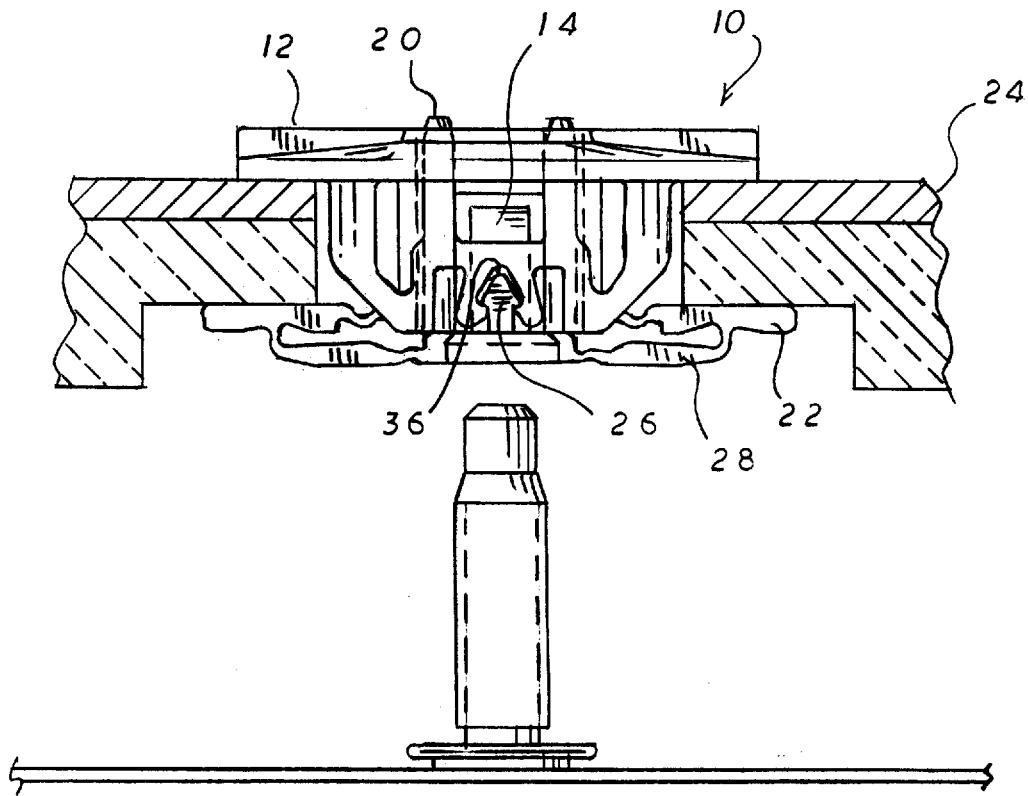
FIG. 4 is a schematic side elevation view of the retaining device shown in a locked insulation retaining position.

As shown in FIG. 4, once the retainer 10 is inserted through a hole in the insulation layer it is secured in place by pushing against the push plate 18 towards the flange 12. This action causes the guide pins 20 to enter the guide holes 40 (see FIG. 1), thus guiding the push plate along a straight path until the locking member 26 enters the locking recess 36 at the base of the stem portion. By virtue of the enlarged head portion of the locking member 26 the locking recess 36 is caused to expand and then contract or snap back in place around the stem of the locking member. At the same time, the locking fingers 22 swing outwardly by reason of the flexible portions 30, 32 and 34, so that the flats of the fingers 22 bear up against the underside of the insulation layer 24, as shown in FIG. 4.

Figure 5:
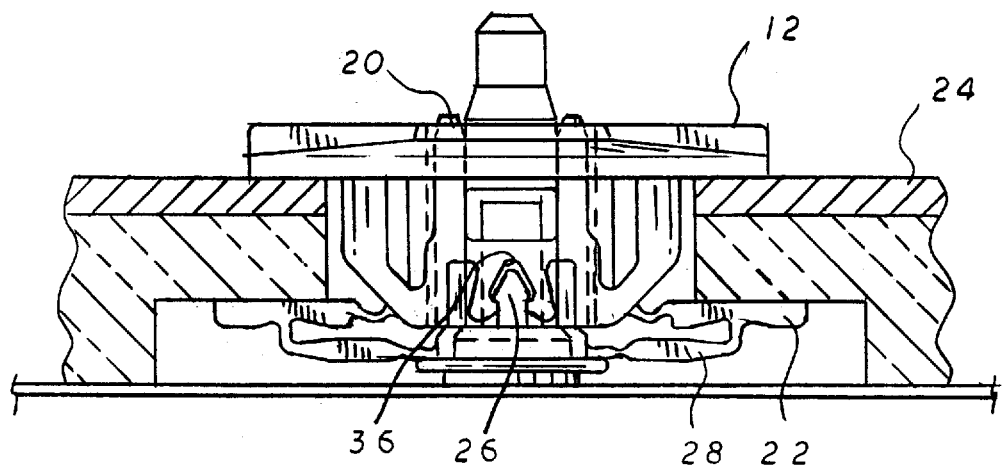
FIG. 5 is a schematic side elevational view of the retaining device shown in FIG. 4 attached to an upstanding stud on a layer of sheet metal.

The insulation retainer 10, according to the invention, is ready for attachment to a suitable stud member 46 extending upwardly from a layer of sheet metal 48 or similar material used in the construction of a vehicle interior. Such stud members are affixed to the sheet metal by suitable welding techniques, as is well known in the art. Also such stud members are normally provided with a threaded shaft, which in the present case is made use of by the pliable locking teeth 44 in the central aperture 14 of the retainer 10. Thus the retainer, together with the insulation it supports, is forced down on the stud member 46 (see FIG. 5) so that the locking teeth engage the threads of the stud member and hold the retainer in place by means of a friction fit between the locking teeth and the threads on the stud. In this way the layer of insulation material 24, by means of a number of such holes and aligned stud members 46, can be pressed and secured firmly against the sheet metal 48.

The retainer 10 can also be removed from the stud member 46 and be reused, if desired. All that is necessary is that a rotational force be applied to the retainer to unscrew it from the stud 46. The retainer can then be restored to its original expanded condition by pulling down on the push plate 18 with sufficient force to overcome the pliable snap-fit connection between the locking member 26 and the locking recess 36. The retainer is then restored to the position shown in FIG. 2 and can be removed from the insulation and be reused in new or repaired insulation in the manner described above.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A retainer for securing a layer of insulation material having at least one hole therein against a layer of sheet material having at least one upstanding stud member, comprising an articulated structure connecting a flange and a push plate, said flange having a diameter adapted to be greater than said hole in said insulation, and said articulated structure and said push plate having a diameter for fitting through said hole, said flange, said articulated structure and said push plate having a central aperture, a part of said articulated structure being movable for gripping an underside of said insulation layer when said push plate is pushed towards said flange, and friction means disposed in said central aperture for gripping said stud member when said retainer with said insulation layer is pushed down on said stud member.

2. A retainer for securing a layer of insulation material having at least one hole therein against a layer of sheet material having at least one upstanding stud member, comprising an articulated structure connecting a flange and a push plate, said flange having a diameter adapted to be greater than said hole in said insulation, and said articulated structure and said push plate having a diameter for fitting through said hole, said flange, said articulated structure and said push plate having a central aperture, said articulated structure having a pair of locking fingers each disposed in a vertical plane and connecting said flange and said push plate, a guide means on said push plate for guiding said push plate along a given path when said push plate is pushed towards said flange to thereby pivot said locking fingers about a horizontal axis to assume a generally horizontal direction for bearing against an underside of said insulation layer, and friction means disposed in said central aperture for gripping said stud member when said retainer with said insulation layer is pushed down on said stud member.

3. A retainer according to claim 2, further comprising a locking member on said push plate for engaging a retention means on said flange for releasably retaining said locking member when said push plate is pushed towards said flange.

4. A retainer for a layer of insulation material having at least one hole therein, comprising an articulated structure connecting a flange and a push plate, said flange having a diameter adapted to be greater than said hole in said insulation, and said articulated structure and said push plate having a diameter for fitting through said hole, said flange, said articulated structure and said push plate having a central aperture, said articulated structure having a pair of locking fingers each disposed in a vertical plane and connecting said flange and said push plate, a guide means on said push plate for guiding said push plate along a given path when said push plate is pushed towards said flange to thereby pivot said locking fingers of said articulated structure about a horizontal axis to assume a generally horizontal direction for bearing against an underside of said insulation layer, and a locking means for holding said push plate in position when said locking fingers have assumed said generally horizontal direction.

5. A retainer according to claim 4, wherein said guide means comprises a pair of pins extending from said push plate and a pair holes in said flange aligned with said pins.

\* \* \* \* \*